Aug. 11, 1959
D. JACOBSEN
2,899,087
AUTOMATIC PARKING SYSTEM
Filed April 19, 1957
12 Sheets-Sheet 1
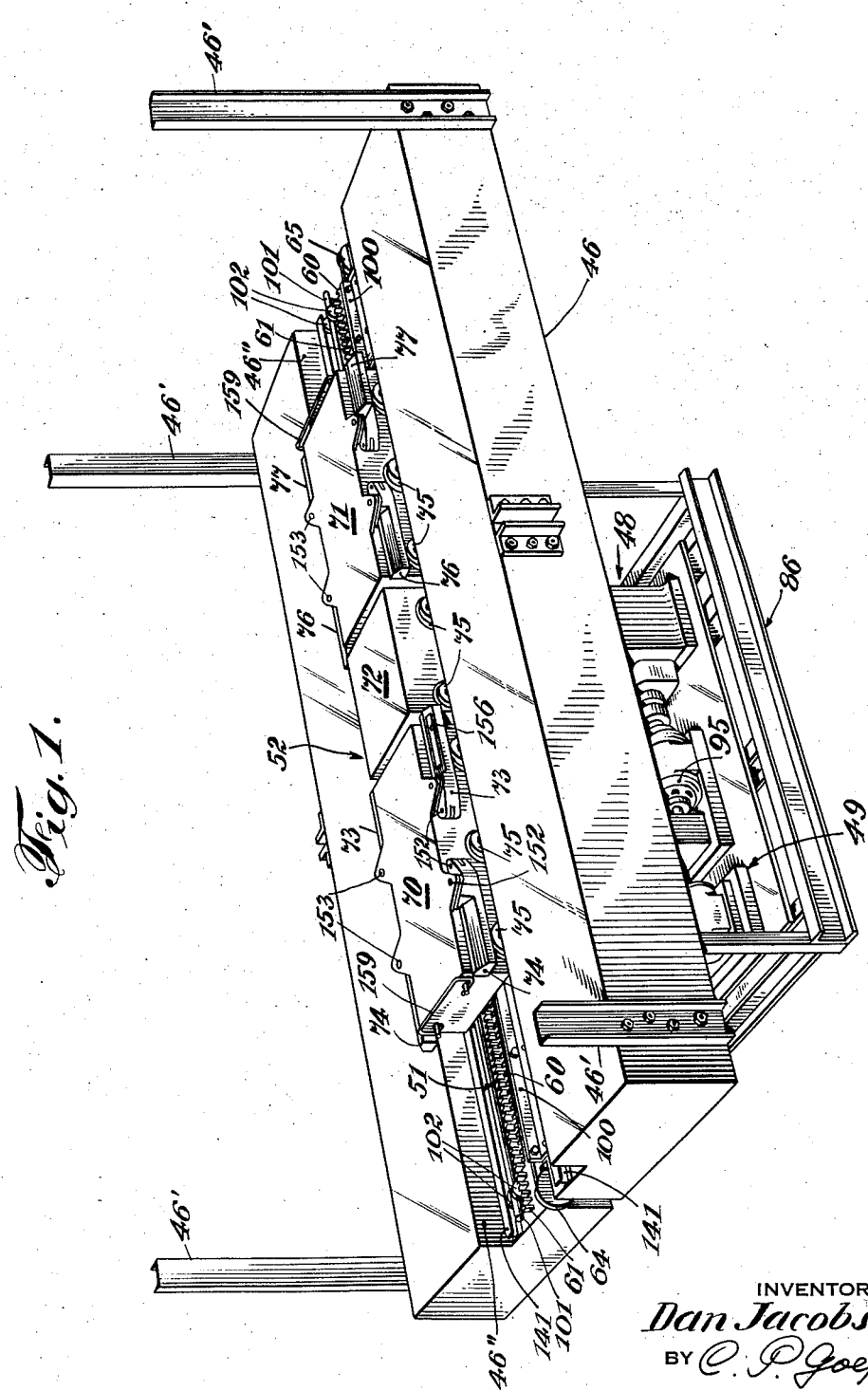
INVENTOR
Dan Jacobsen
BY
his ATTORNEY Aug. 11, 1959    D. JACOBSEN    2,899,087
AUTOMATIC PARKING SYSTEM
Filed April 19, 1957    12 Sheets-Sheet 2
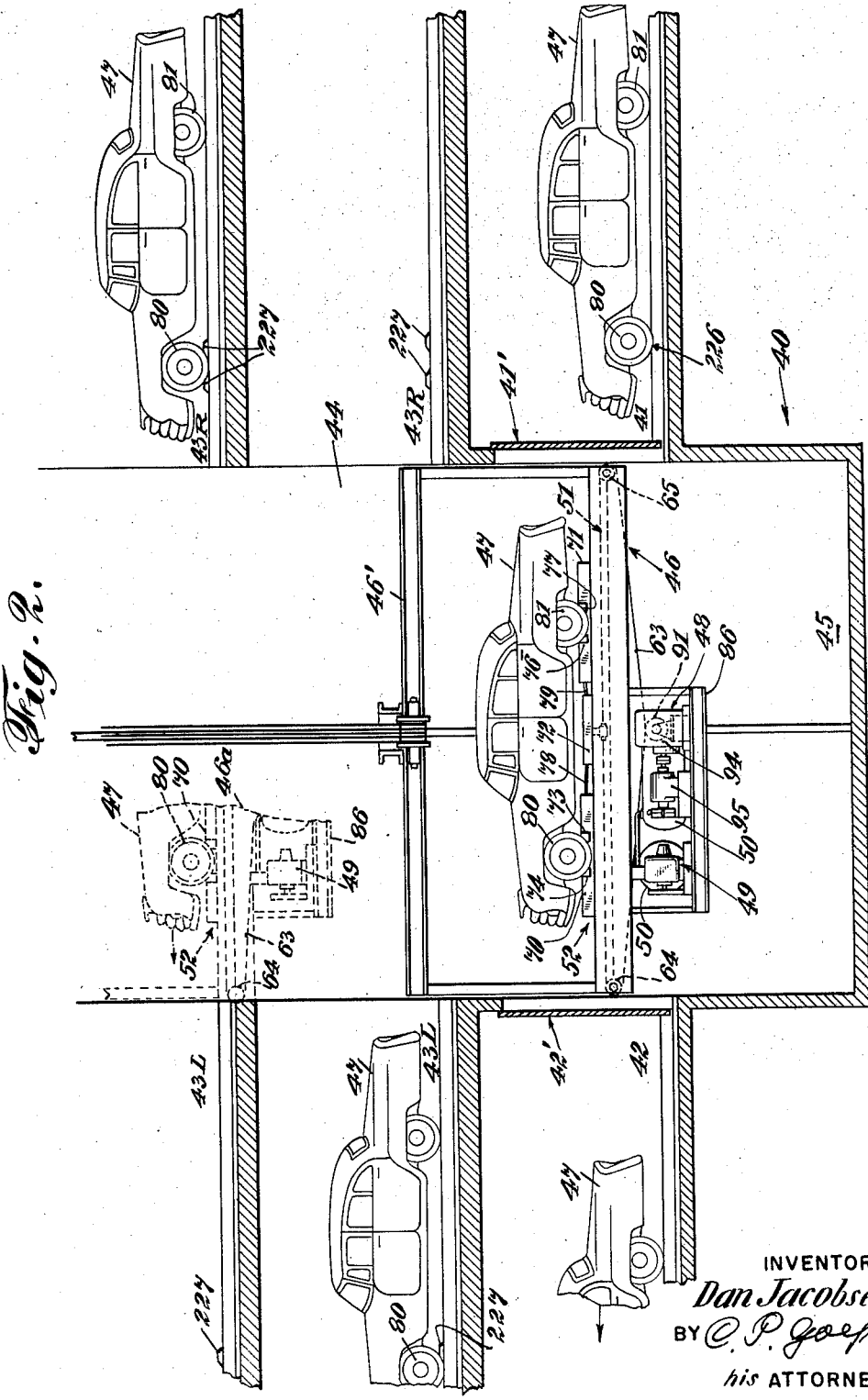
INVENTOR
Dan Jacobsen
BY C. P. Goepel
his ATTORNEY

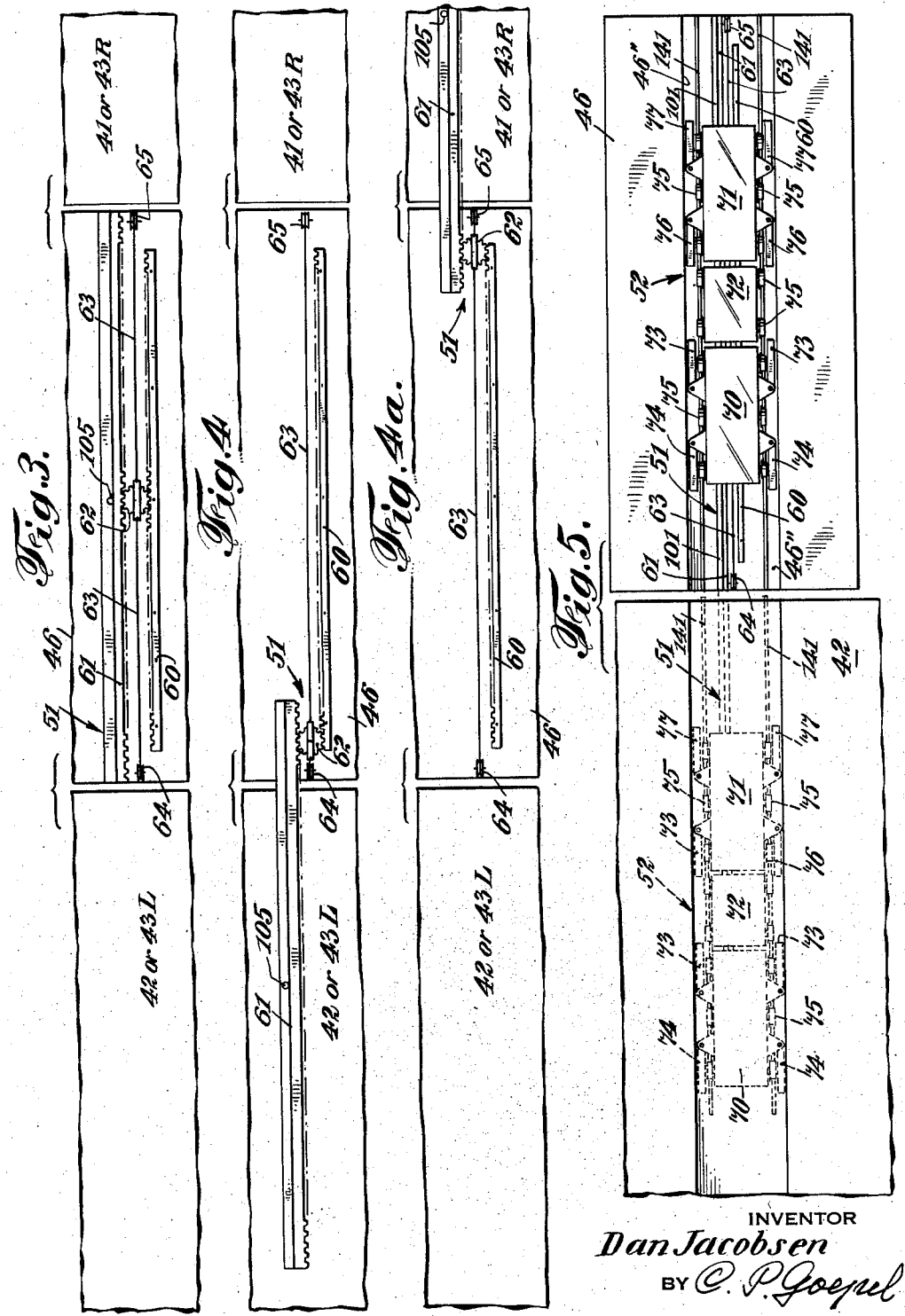

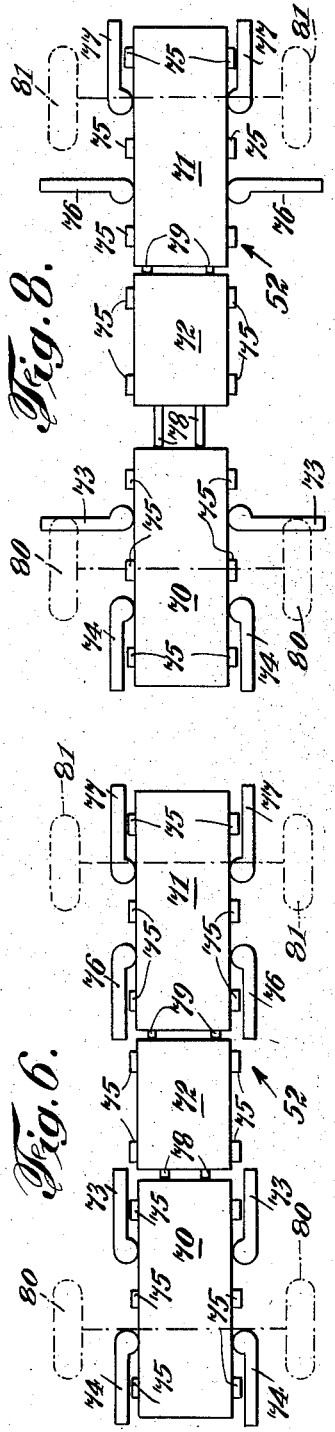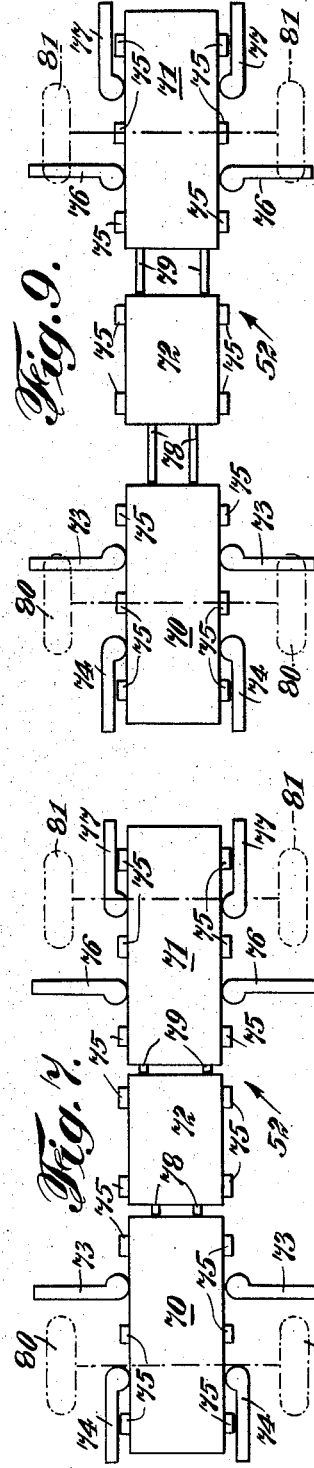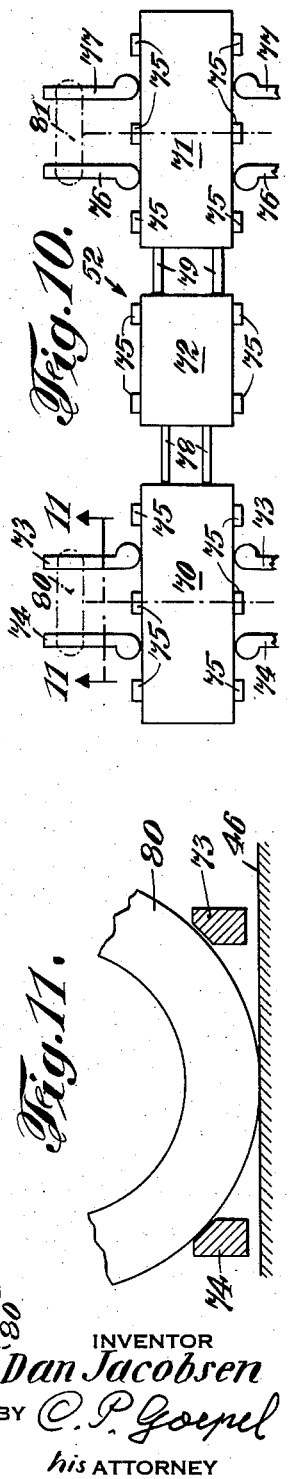

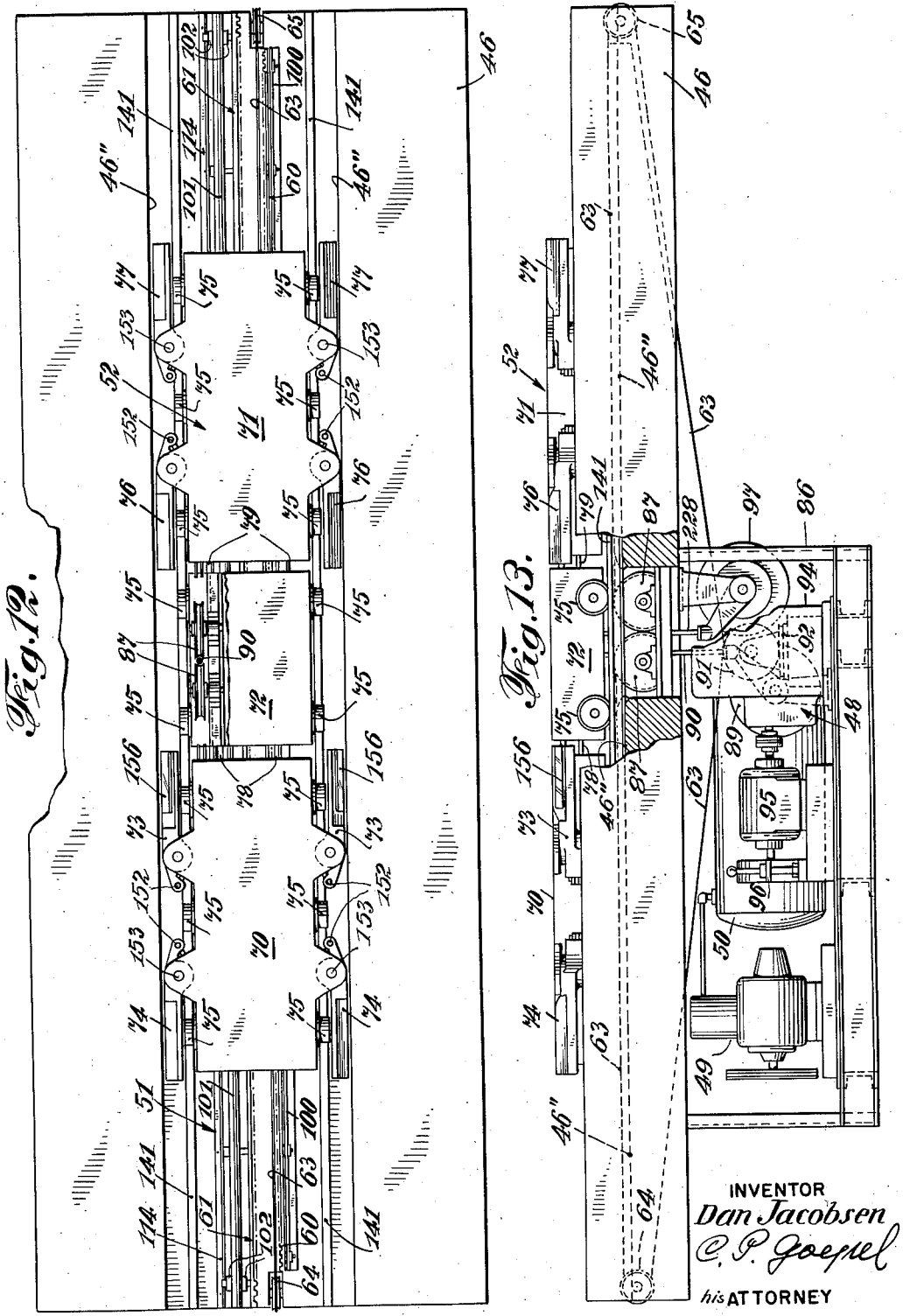

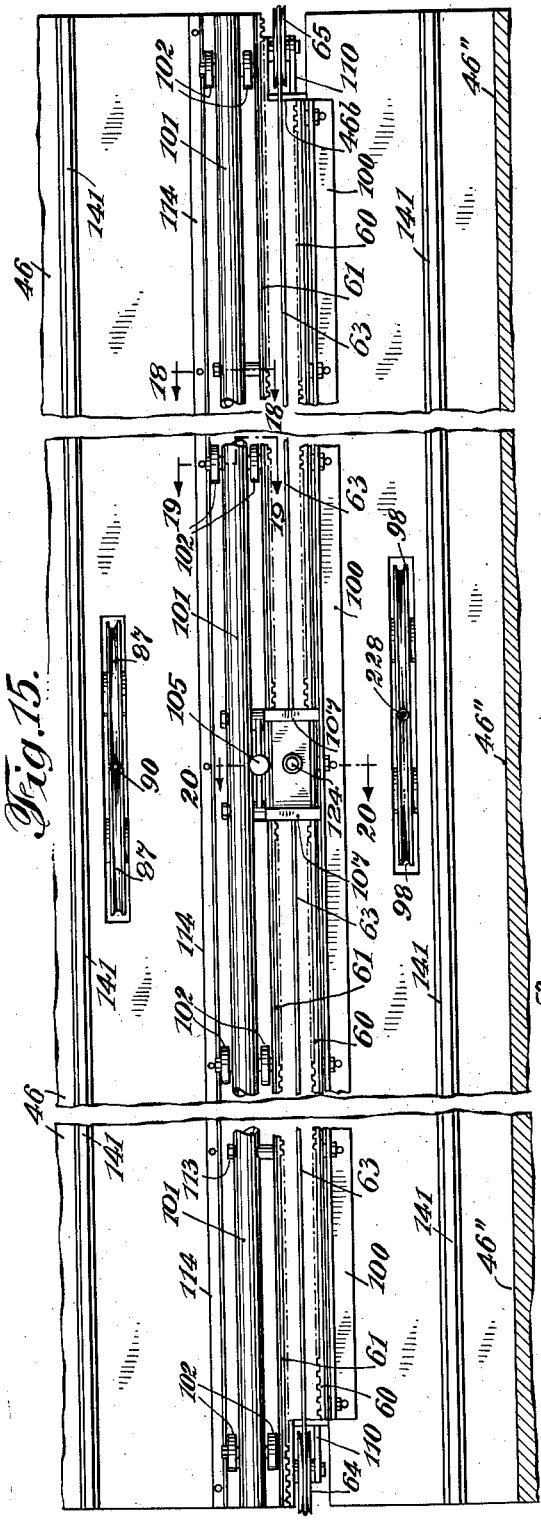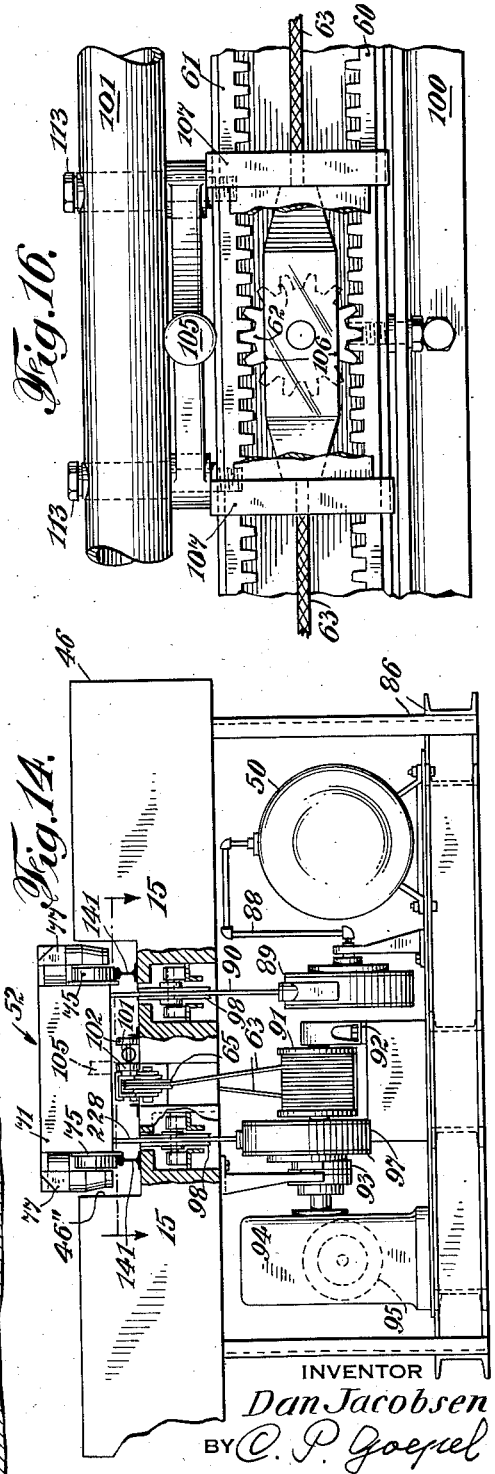

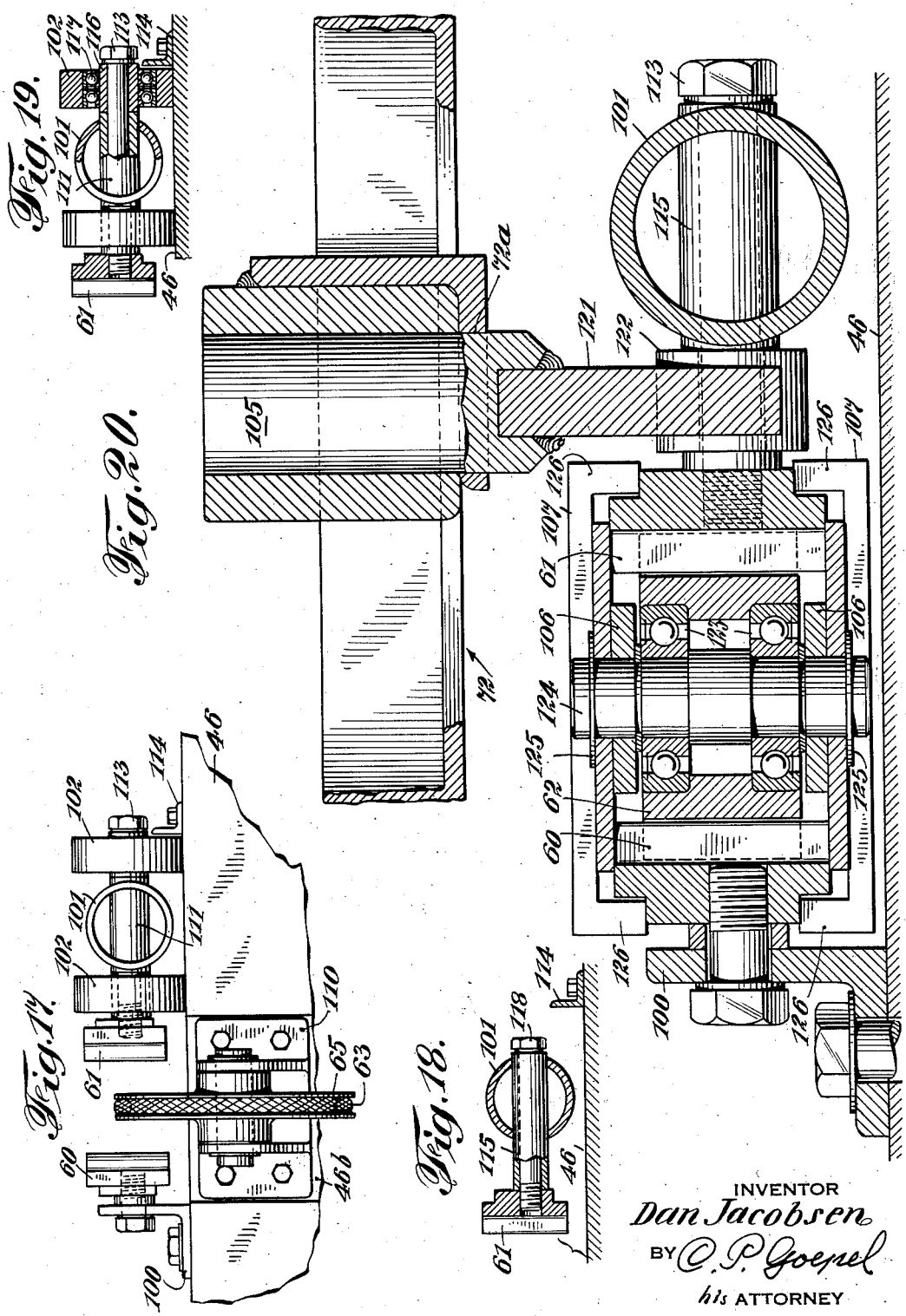

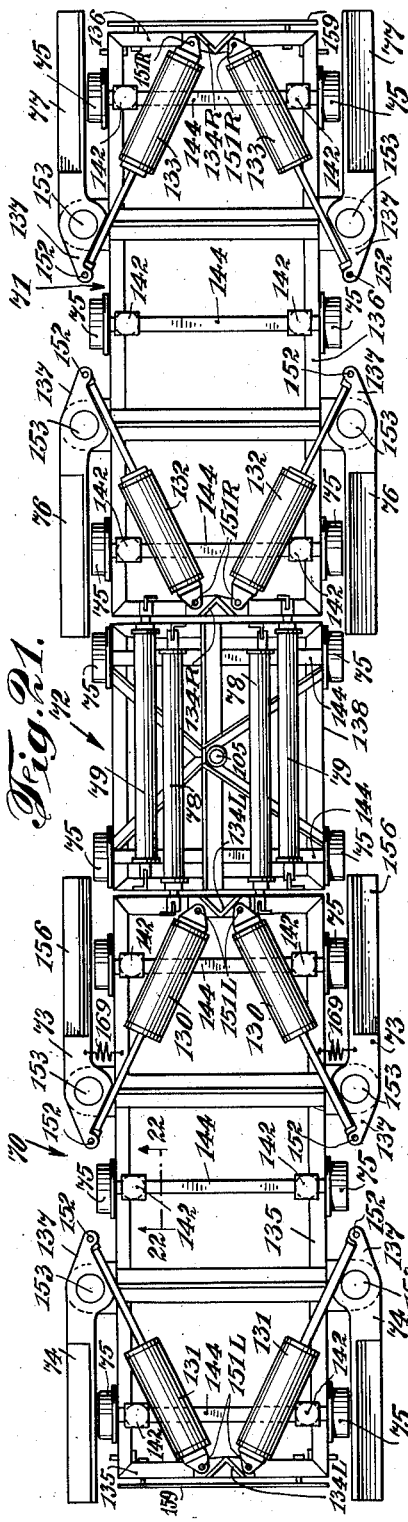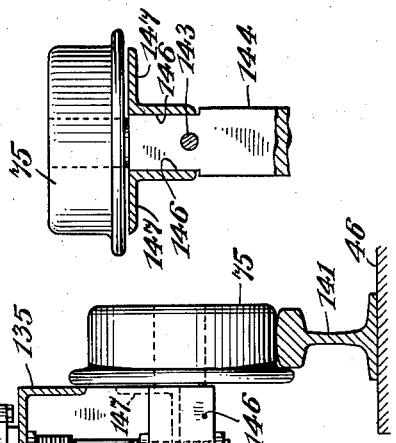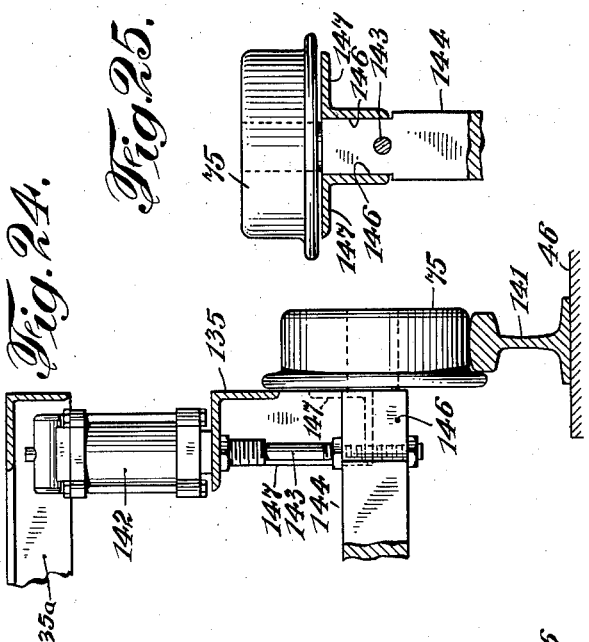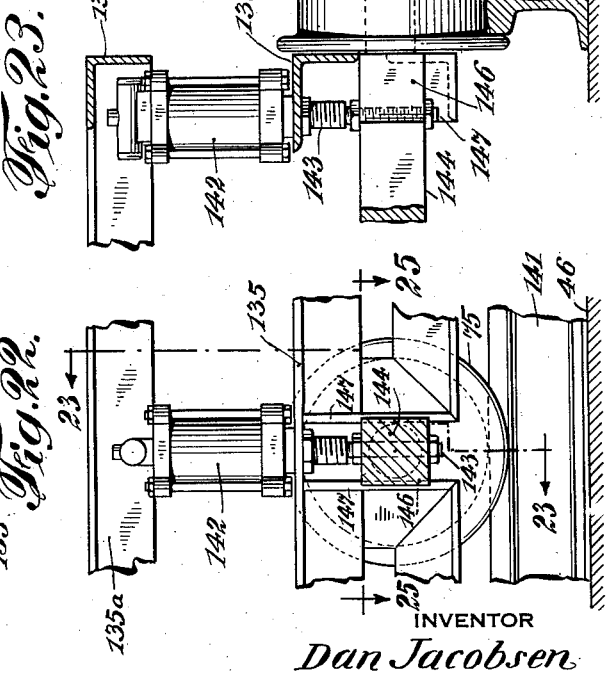

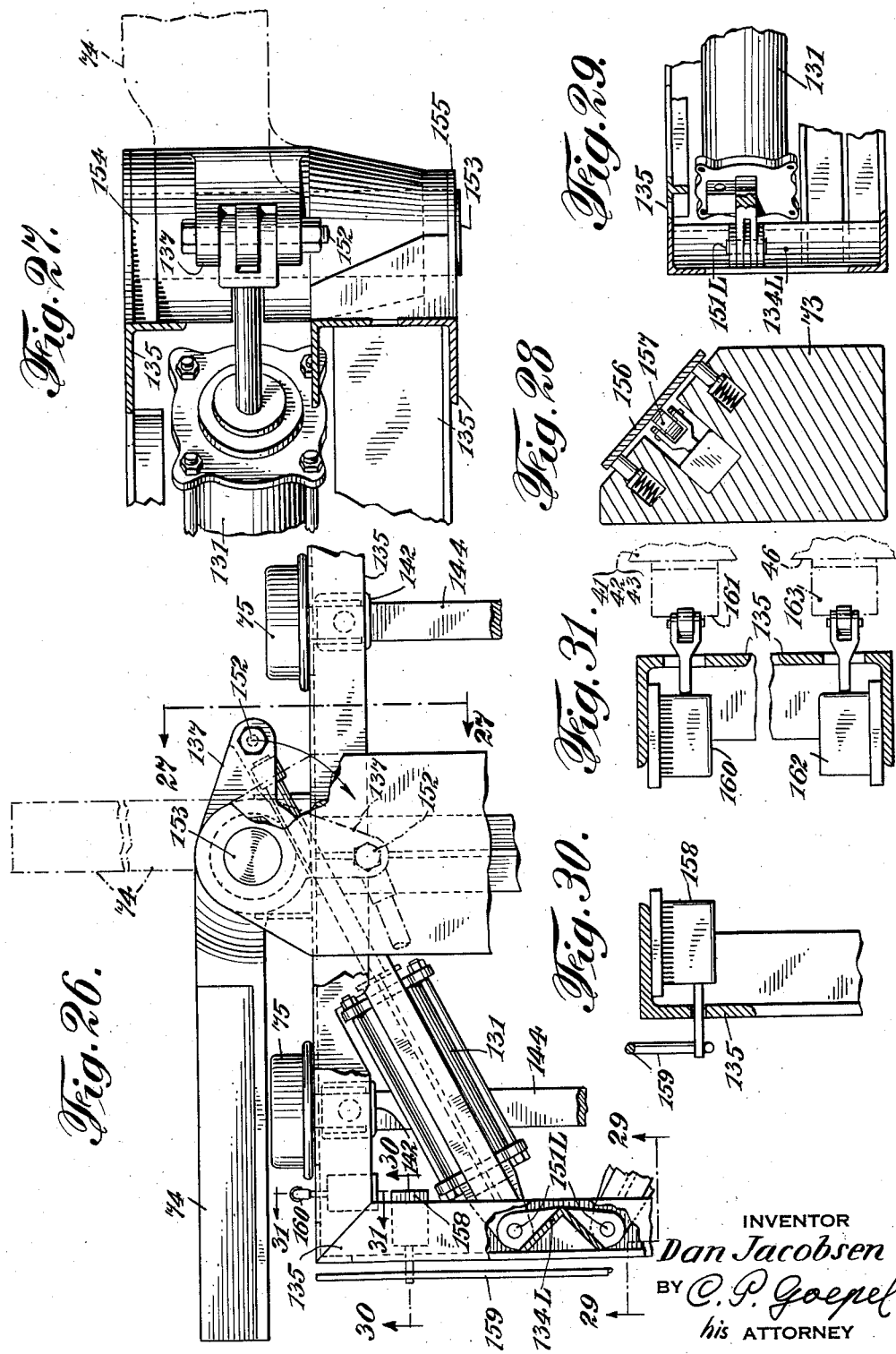

Aug. 11, 1959  D. JACOBSEN  2,899,087
AUTOMATIC PARKING SYSTEM
Filed April 19, 1957  12 Sheets-Sheet 10
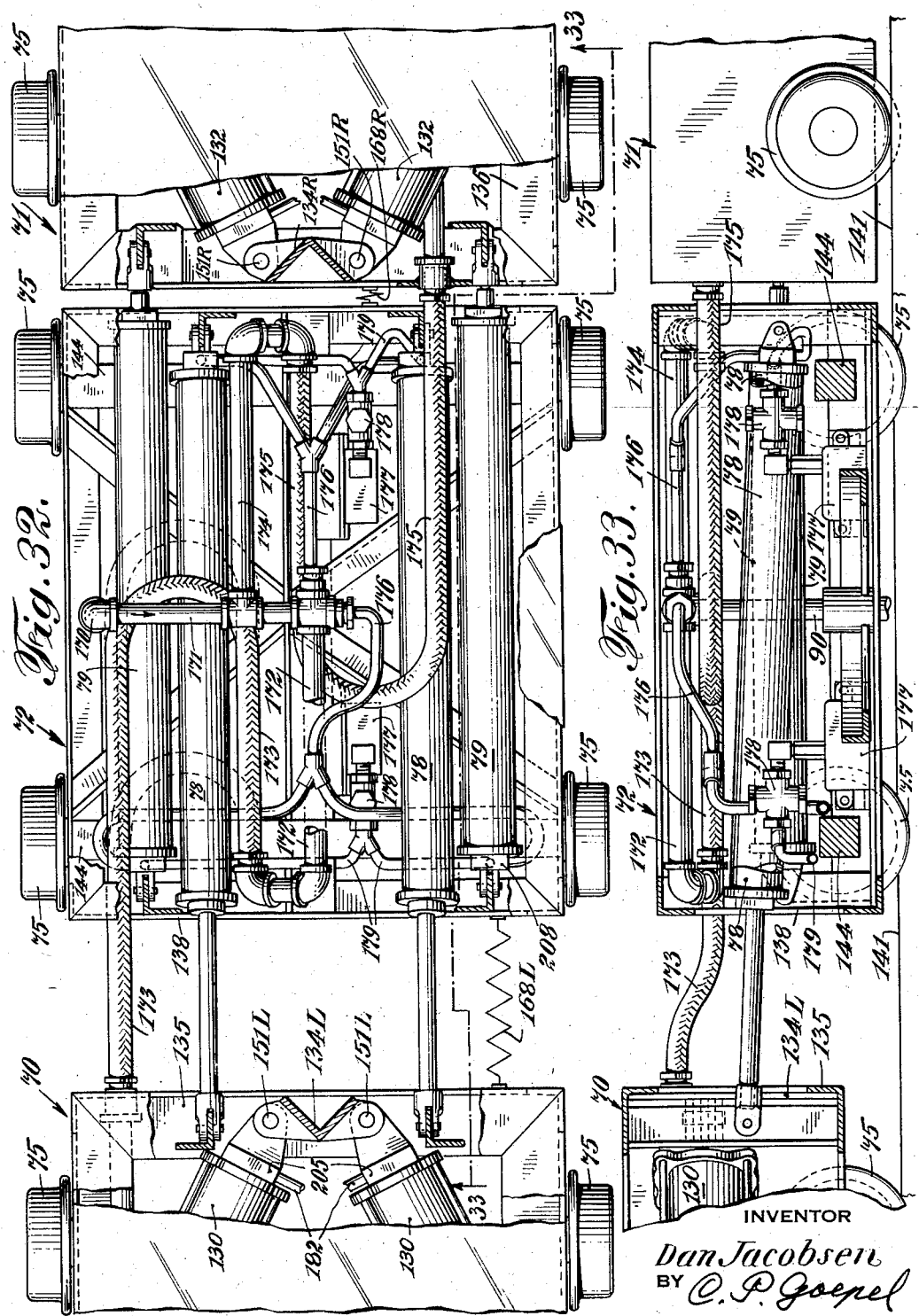
INVENTOR
Dan Jacobsen
BY C. P. Goepel
his ATTORNEY

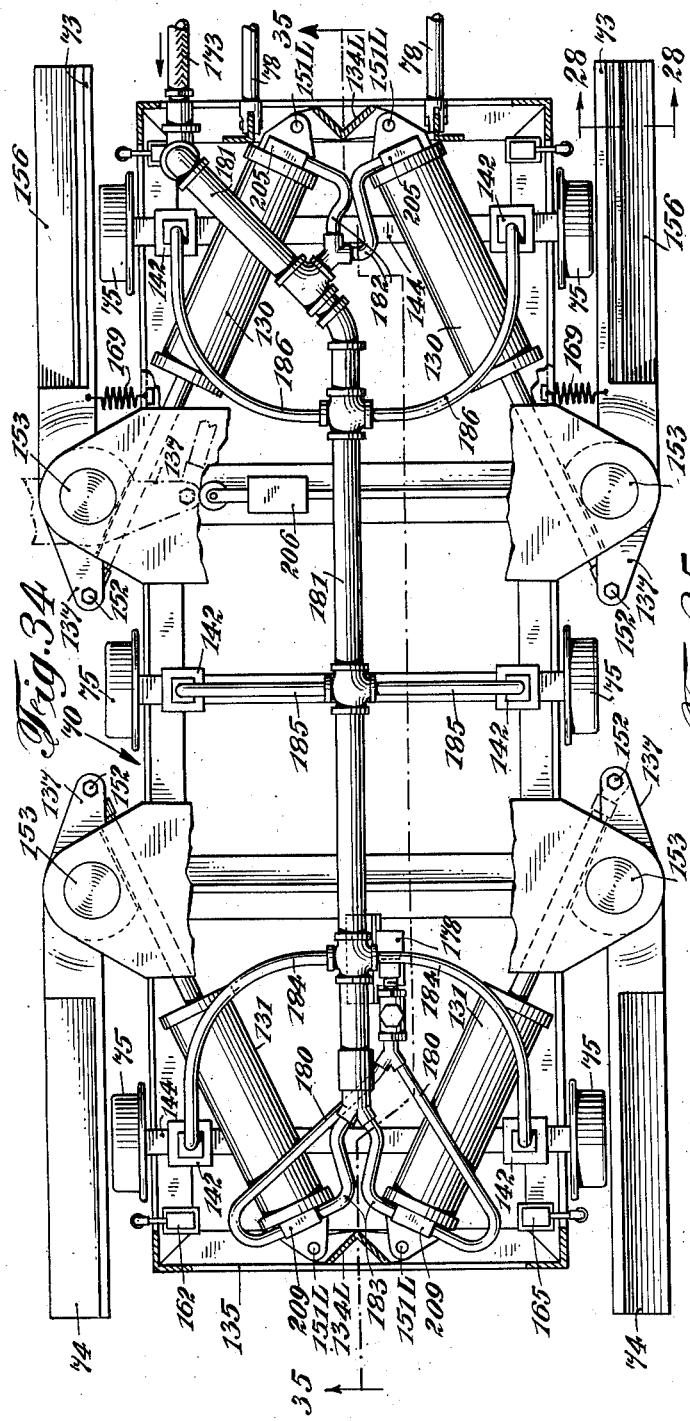

Aug. 11, 1959

D. JACOBSEN 2,899,087

AUTOMATIC PARKING SYSTEM

Filed April 19, 1957

INVENTOR
Dan Jacobsen
BY C. P. Goepel
his ATTORNEY

United States Patent Office 2,899,087
Patented Aug. 11, 1959

2,899,087

AUTOMATIC PARKING SYSTEM

Dan Jacobsen, Clarks Summit, Pa., assignor to Cycon, Inc., Scranton, Pa., a corporation of Pennsylvania Application April 19, 1957, Serial No. 653,804

13 Claims. (Cl. 214—16.1)

The present invention relates to a system for parking and storage of vehicles moving on wheels, and more particularly to an apparatus for parking and unparking of automobiles.

The principal object of the invention is to provide an automatic system for parking and storing of vehicles which requires no physical control excepting for the start of the parking or unparking operation.

Another object of the invention is to provide in a parking system of the above character a vehicle transfer device so constructed as to be usable for the conveying of vehicles with different wheel bases and of different widths, without touching the body or chassis of the vehicle.

A further object of the invention is to provide means for automatic transfer of vehicles which include parts extendable in two directions to engage and carry a vehicle irrespective of its wheel base or width.

A still further object of the invention is to provide for each elevator of a vehicle parking system a single transfer device of the above character which is adapted to engage and transport a vehicle into or from parking stalls adjacent the elevator shaft by engaging the vehicle only by its wheels.

A yet further object of the invention is to provide a device of the above character for transportation of the vehicles which is combined with pneumatic actuating means and flexible conduits enabling the device to move into a plurality of parking compartments for deposition or removal of vehicles.

An additional object of the present invention is to provide a combined electropneumatic control system for the actuation of the vehicle transfer device above referred to, which is so constructed and arranged that it may be actuated by a single impulse-transmitting element either for parking or unparking of a vehicle located in a given compartment or on the elevator platform.

A still further object of the invention is to provide in combination with a device for transporting automobiles of the character above set forth various control and drive mechanisms incorporated in and connected with the platform of an elevator in a multi-storey parking system.

A yet further object of the invention is to provide in a parking system including a plurality of parking compartments and a central elevator with means for actuating same, a single device for transportation of vehicles onto the elevator and into and out of the individual compartments without any control by the person in charge of the parking system.

An additional important object of the present invention is to provide in the parking system above referred to means for indicating any improper functioning of the system and means for immediately inactivating the drive unit if the operation of the actuating device is disrupted or otherwise affected in any unforeseen and undesirable manner.

Basically, the invention resides in the provision of a dolly train consisting of a center dolly and two end dollies, together with suitable means on the garage elevator and in each parking compartment for guiding the dolly train with or without a vehicle thereon into proper position for loading or unloading. A combined electropneumatic system controls the movements of the dollies relative to one another and into and from the various parking compartments. The platforms of the end dollies may be lifted above the level of the center dolly to move a vehicle above the ground for transportation onto the elevator platform, and into or out of one of the parking compartments. The end dollies are each provided with two pairs of articulately connected arms to engage the wheels of a stationary automobile in such manner that the vehicle may be transported without any of the elements forming part of the conveyor system touching its chassis. The control system includes various devices for inactivating the drive mechanism if an obstruction or other irregularity in the operation is encountered during the parking or unparking of a vehicle.

The novel system is relatively simple and provides for substantial savings in operational costs as the number of attendants is reduced and a single conveyor apparatus may service a multi-storey garage for a great number of vehicles.

Other objects, features and attributes of the novel parking system as well as of the conveying apparatus and elements forming part thereof will become apparent in the course of the following detailed description of the embodiment selected for illustration in the accompanying drawing, and the invention will be finally pointed out in the appended claims.

In the drawing,

Fig. 1 is a perspective view of the parking system elevator with the vehicle transfer and parking device thereon in idle position and parts of the suspended drive for the parking device;

Fig. 2 is a schematic cross-sectional view of a parking garage with a plurality of stalls and the loaded elevator in an intermediate position between two storeys of the garage;

Fig. 3 is a partial top plan view of the elevator platform and two adjacent parking stalls, with means for communicating motion to the vehicle transfer device in central position on the elevator platform;

Fig. 4 is a view similar to that of Fig. 3, with the motion communicating device or runner extended toward left;

Fig. 4a shows the elements of Figs. 3 and 4, with the runner extended toward right;

Fig. 5 is a top plan view of the elevator platform with the vehicle transport device or dolly train in full lines, further showing the position of the dolly train in the adjacent left-hand parking compartment in broken lines;

Fig. 6 is a schematic top plan view of the dolly train in the position before its articulate arms engage the wheels of an automobile which are shown in dot-dash lines;

Fig. 7 shows the dolly train in the position of Fig. 6 with a pair of arms on the front end dolly extended;

Fig. 8 illustrates the next step in the operation of the dolly train, according to which the front end dolly is moved away from the center dolly until its inner extended arms engage two wheels from one side;

Fig. 9 shows all four inner arms of the end dollies in engagement with the wheels;

Fig. 10 shows the last stage of the operation of the dolly train before lifting, in which each wheel is engaged by a pair of arms;

Fig. 11 is an enlarged section taken on line 11—11 in Fig. 10, illustrating the manner in which the dolly arms engage the wheels;

Fig. 12 is an enlarged view of the structure shown in full lines in Fig. 5, illustrating the dolly train and the runner in greater detail;

Fig. 13 is a side elevational view of the elevator platform in partial section, showing the dolly train thereon and the suspended drive mechanism therefor;

Fig. 14 is a right-hand end view of the elevator platform shown in Figs. 12 and 13;

Fig. 15 is an enlarged section taken on line 15—15 in Fig. 14, showing the runner construction in greater detail;

Fig. 16 is an enlarged detail view of a portion of the runner;

Fig. 17 is an enlarged partial right-hand end view of the structure shown in Fig. 15;

Figs. 18 to 20 are enlarged transverse sectional views taken on lines 18—18, 19—19 and 20—20, respectively, in Fig. 15;

Fig. 21 is a top plan view of the dolly train in idle position with the cover plates removed;

Fig. 22 is an enlarged section taken on line 22—22 in Fig. 21;

Fig. 23 is a section taken on line 23—23 in Fig. 22;

Fig. 24 is a view similar to that of Fig. 23, with the frame of one end dolly shown in raised position;

Fig. 25 is a section taken on line 25—25 in Fig. 22;

Fig. 26 is an enlarged view of the upper left-hand corner of Fig. 21, with certain parts broken away, illustrating in detail one arm-actuating cylinder and its connection with the arm;

Fig. 27 is an enlarged section taken on line 27—27 in Fig. 26;

Fig. 28 is an enlarged section taken on line 28—28 in Fig. 34;

Figs. 29 to 31 are enlarged sections taken, respectively, on lines 29—29, 30—30 and 31—31 in Fig. 26;

Fig. 32 is an enlarged top plan view of the center dolly, with the cover plate removed to show the pneumatic piping and cylinder arrangement, and partial top plan view of the end dollies;

Fig. 33 is a side elevational view of the dolly train in partial section, taken on line 33—33 in Fig. 32;

Fig. 34 is an enlarged top plan view of an end dolly with the cover plate removed and certain parts broken away to show the pneumatic piping and cylinder arrangements, as seen from line 34—34 in Fig. 35, in the direction of arrows;

Fig. 35 is a longitudinal section taken on line 35—35 in Fig. 34; and

Fig. 36 is a schematic diagram of the electropneumatic actuating and control system for the dolly train.

Referring now in detail to the drawing, and first to Fig. 1, the elevator platform 46 is suspended in a metallic frame 46' adapted to be moved in the elevator shaft 44 (see Fig. 2) by a mechanism of known construction which is not illustrated. The dolly train 52, shown in a longitudinal recess 46'' in the center of the elevator platform 46, travels on rails 1-41 and is movable onto the rails in the right- or left-hand storage, loading or unloading compartments shown in Fig. 2 by the runner assembly 51. The winch and driving mechanism 48, together with the motor and compressor 49 are shown on an auxiliary platform 86 suspended beneath the elevator platform 46.

Fig. 2 illustrates in vertical section a multiplatform garage building 40 with the novel vehicle transportation system incorporated in the elevator platform 46 and partly in the individual storage and loading compartments. The building includes a loading compartment 41 which, as shown, is preferably at the level of the unloading compartment 42, and a plurality of left- and right-hand storage compartments 43L, 43R, respectively, which, in the embodiment shown, are all above the loading area 41. It will be understood, however, that similar storage compartments may be provided below the level of compartments 41 and 42 if the novel system is used in an underground garage. Each of the compartments 41 to 43 is in communication with the elevator shaft 44, the latter terminating at its lower end in a pit 45 to give clearance for the auxiliary platform 86 when the elevator is at the level of platforms in compartments 41 and 42. The communicating openings between the compartments 41, 42 and the elevator shaft 44 are usually closed by respective doors 41', 42' when the elevator is in motion or not at the level of the loading platform. Similar doors (not shown) may be provided between the shaft 44 and the compartments 43L, 43R.

The elevator platform 46 with a vehicle 47 on the dolly train 52 is shown in upward motion. When it reaches the position 46a shown in broken lines at the platform level of an empty storage compartment 43L, the dolly train 52, moved by the runner assembly 51, transports the vehicle into the compartment 43L and releases it in a position wherein the front wheels 80 rest between a pair of suitable arresting members 227, or in a depression 226 (shown in the loading compartment 41). Motion is transmitted to the runner assembly 51 and to the dolly train 52 by cables 63 which latter are moved by the drive assembly on the auxiliary platform 86 below the elevator platform 46. The drive assembly, in addition to the winch and driving mechanism 48 and the motor and air compressor 49, also includes the air receiver or tank 50. The winch drum 91 is driven through a gear reducer 94 by the electric motor 95, as is best shown in Figs. 13 and 14. When the drum 91 is rotated, cables 63 move the runner assembly 51 and the dolly train 52 toward right or left from the elevator platform 46, or back from a compartment onto the platform. There is a stud connection between the dolly train 52 and the runner assembly 51. The dolly train is extended and its arms articulated into position to receive, lift and transport a car by a plurality of air cylinders fed from the tank 50 on the auxiliary platform 86, which receives air from the electric motor driven compressor 49.

The components of the power source are readily available manufactured items which are illustrated and referred to in the description for better understanding of the present invention. The air from tank 50 is piped to a reel 89 (see Figs. 13 and 14) whose flexible hose 90 passes between two sheaves 87 to the center dolly 72, where it branches off to supply the individual cylinders. The reel 89 plays hose 90 in and out as the dolly train 52 moves to right or to left, or returns to the center of the elevator platform 46. Cable 63 passes over pulleys 64, 65 to a gear 62 which actuates the runner 61, as is shown in Figs. 3 to 5 and 14 to 16.

Figs. 3, 4 and 4a illustrate runner 61 in three positions, to wit: centered on the platform 46, extended to left onto the platform of compartment 42 or one of compartments 43L, and extended to right onto the platform of compartment 41 or one of the compartments 43R. The runner assembly 51 includes a stationary rack 60 which is bolted to the platform 46, the movable rack or runner 61, the gear 62 meshing with the teeth of racks 60 and 61, cable 63, and pulleys 64, 65 attached to the left- and right-hand end of the elevator platform 46, respectively. The gear 62 may travel between the two extremities of the stationary rack 60 to move the runner 61 and the dolly train 52 engaged by a stud or king pin 105 either to left into the unloading compartment 42 or into one of the compartments 43L (see Figs. 2 and 4), or to right into the loading compartment 41 or into one of the compartments 43R (see Fig. 4a).

In Fig. 5, the dolly train is in the position on the elevator platform 46 which is shown in full lines when the movable rack 61 is in the position of Fig. 3. Should the rack 61 move toward left, for example into the compartment 42 (see Fig. 4), the dolly train is entrained by the stud 105 and moves into the position shown in broken lines in Fig. 5. It will be observed that the articulating arms of the dolly train shown in Fig. 5 are folded and that the end dollies 70, 71 are immediately adjacent the center dolly 72. The assembly 52 is thus (a) either ready to move longitudinally below the body and between the wheels 80, 81 of an automobile awaiting storage in loading compartment 41 or about to be removed from one of the storage compartments 43L, 43R; or (b) returning from one of the storage compartments or from the unloading compartment 42 after having deposited a vehicle 47 therein.

The sequence of articulation of certain elements forming part of the dolly train 52 is illustrated in somewhat diagrammatic form in Figs. 6 to 10. The dolly train includes a front (left-hand) end dolly 70, center dolly 72 and a rear (right-hand) end dolly 71. The front dolly 70 includes two inner arms 73, two outer arms 74 and six wheels 75 upon which it rides on the rails 141. The end dolly 71 is of similar construction in that it includes two inner arms 76, two outer arms 77 and six wheels 75. The center dolly 72 comprises four wheels 75, two left-hand pneumatic cylinders 78 which move the front dolly with respect to the center dolly 72, and two right-hand cylinders 79 which impart motion to the rear dolly 71 with respect to the center dolly 72. Cylinders 78, 79 are pivotally connected to the center dolly 72 and to the respective end dollies 70, 71, enabling the frames of the end dollies to move in vertical direction above to the upper face of dolly 72.

The dolly train shown in Figs. 6 to 10 is under the body of a four-wheeled vehicle having a pair of front wheels 80 and a pair of rear wheels 81 which are all indicated in dot-dash lines. In Fig. 6, the dolly train 52 is in a position shown either in full or in broken lines in Fig. 5 on elevator platform 46 and on the platform of unloading compartment 42, respectively, except that it is now assumed to be under a vehicle 47 in one of the compartments 41, 43L or 43R ready to engage the wheels 80, 81 and to lift the vehicle above the platform, whereupon the runner 61 causes it to carry the vehicle to its destination.

As the first step toward engagement with the respective front and rear wheels 80, 81, the inner arms 73 and 76 are distended for about 90 degrees (see Fig. 7). As these arms reach their extreme distended positions, they automatically trigger the next movement through suitable limit switches which will be fully described as the description proceeds.

As shown in Fig. 8, the next to move is the front dolly 70 which travels to left influenced by the pneumatic cylinders 78 to bring its inner arms 73 into engagement with the front wheels 80. Limit switches (not shown) on arms 73 then cause the cylinders 79 to move the rear dolly 71 toward right until its inner arms 76, which are already distended, engage the rear wheels 81 (see Fig. 9). It is preferred to continue the action of cylinders 78 while the rear end dolly 71 is in motion, whereby the center dolly 72 also moves toward right to reduce the time necessary for engagement of inner arms 76 with the rear wheels 81, particularly when vehicles with longer wheel bases must be parked. This will be noted upon a careful observation of Figs. 8 and 9 showing that the distance between dollies 70 and 72 is greater in Fig. 9 than in Fig. 8. The cylinder pairs 78, 79 thus enable the dolly train 52 to move vehicles with different wheel bases, and the length of arms 73, 74 and 76, 77 is so selected that the arms may engage with the wheels of a relatively narrow or wide vehicle.

When the inner arms 73, 76 come into contact with and bear against the respective front and rear wheels 80, 81, the pressure in cylinders 78, 79 builds up and causes operation of switches 177 (see Figs. 32 and 33) which expand the outer arms 74 and 77 to engage the opposing sides of the wheels, as is shown in Fig. 10. Upon distension of arms 74 and 77, the pressure in the cylinders 131, 133 which actuate said arms builds up and causes switches 178 (see Figs. 34 and 35) to trigger the elevating jacks 142 shown in more detail in Figs. 22 to 24. The cylinders of jacks 142 then raise the frames of end dollies 70, 71 with the vehicle, which puts the entire weight onto the flanged wheels 75 of the two end dollies.

Fig. 11 illustrates the manner in which one front wheel 80 of the automobile is engaged by the arms 73 and 74 of the front end dolly 70 before the frames of the two end dollies are lifted. While the dolly train 52 could travel into the compartments 41 and 42 to move a vehicle onto or from the elevator platform 46, the operation may be simplified in that the vehicle 47 can be driven onto the elevator platform above an idle dolly train 52 shown, for example, in Fig. 5, and from the elevator platform into and through the unloading compartment 42 after the vehicle has been removed from one of the storage compartments 43L or 43R.

Figs. 12 to 20 illustrate in great detail the elevator platform 46 with the runner assembly 51 and dolly train 52, as well as the apparatus mounted on the auxiliary platform 86 beneath the elevator platform, and certain constructional details of these devices.

The elevator platform by itself forms no part of the present invention. Its function is to convey the dolly train 52 with or without a vehicle thereon to a desired level for loading, parking or unloading the same. It carries the auxiliary platform 86 which, as best shown in Figs. 13 and 14, includes the winch and drive 48, the air compressor and motor 49, and the air receiver or tank 50. The flanged wheels 75 of the dollies 70 to 72 travel on rails 141 in the recess 46″ in the elevator platform (see Figs. 12 and 14). Similarly disposed pairs of rails are also provided in each of the compartments 41 to 43. In Fig. 12, a part of the platform of center dolly 72 is broken away to reveal the guide sheaves 87 for the air hose 90 which latter supplies compressed air to the various cylinders on the dollies.

Referring now in more detail to Figs. 13 and 14, air from the tank 50 is conveyed through piping 88 into the hose reel 89 whence it is conveyed to the various cylinders by the flexible hose 90, as disclosed before. Cables 63, whose free ends are attached to the double clevis 106 receiving the gear 62 (see Figs. 15 and 16), run over the end pulleys 64, 65 and the winch drum 91. The shaft of the winch drum 91 is supported in bearings 92 and is connected by a flexible coupling 93 with the gear reducing unit 94 which latter is driven by the motor 95. Motor 95 is provided with an electric brake 96 of known construction. A cable reel 97 feeds out cable 228 over sheaves 98 to carry control wires to the dolly train 52.

The stationary rack 60 of the runner assembly 51 is bolted to a steel angle 100 which is rigidly connected with the elevator platform 46 in the recess 46″. The movable rack 61 is fastened to a rigid pipe support 101 which rides on rollers 102. Thus, the rack 61 and the pipe support 101 may reciprocate as a unit in two directions from the elevator platform 46. The vertical king pin 105 at the center of movable rack 61 engages with the center dolly 72, thus causing the entire dolly train 52 to move in a desired direction and to the extent controlled by the gear 62 and cables 63. Gear 62 in central position, i.e., in line with the king pin 105, is best shown in Fig. 16. The double clevis 106 in which the gear 62 rotates and to which the ends of cables 63 are fastened, is received in two retaining frames 107. The latter hold the assembly of gear 62 and clevis 106 together in a manner permitting its sliding movement along the racks 60, 61 to keep them in mesh with the gear 62, as is shown in greater detail in Fig. 20.

In Fig. 17, which is an enlarged detail right-hand end view of the elevator platform shown in Fig. 15, the racks 60 and 61, as well as one guide sheave and pipe 101 are shown in full detail. Sheave 65 is mounted on a special bracket 110 bolted to the platform 46 in a lateral recess 46b. The pipe 101, to which the movable rack 61 is connected by a plurality of bolts 113 passing through spaced-at-intervals horizontal steel tubes 111, moves in longitudinal direction in the recess 46" on rollers 102. The latter are rotatably mounted on bearings adjacent to the ends of the tube 111 on two sides of the pipe 101, the outer rollers abutting against a guide angle 114 which is bolted to the elevator platform 46. As before stated, the guide angle 100, which is bolted to the platform 46, rigidly supports the stationary rack 60.

To provide a safe and more rigid connection between the pipe 101 and the movable rack 61, these two elements of the runner assembly 51 are connected at one, two or more points between the spaced tubes 111, as may be observed in Fig. 15. Each connection includes a bolt 118 within a steel tube 115, both shown on an enlarged scale in Fig. 18. The mounting of runner rollers 102 is shown in Fig. 19. A steel sleeve 16 is turned down to take a standard ball bearing 117 in the axial bore of each roller 102. The tube 111 extends between the sleeves 116 of two rollers and is bolted to the movable rack 61 by members 113.

The connection between the center dolly 72 and the movable rack 61 is shown on a greatly enlarged scale in Fig. 20. The runner assembly 51 is in its central position on platform 46, as indicated in Fig. 15 where the sectional view of Fig. 20 is taken. The lower end of king pin 105, extending through an opening 72a in the platform of center dolly 72, is welded to a plate 121 which in turn is welded to two bosses 122. The bosses 122 are drilled to take two of the bolts 113 passing through the tubes 115 and into the movable rack 61. Gear 62 is mounted on two ball bearings 123 on a vertical pin 124. The latter also holds the double clevis 106 in the twin frame 107 between the retainer rings 125. Each of the frame halves 107 has a pair of lugs 126 which ride along ways in the racks 60 and 61 to hold the same in mesh with gear 62 regardless of the movement of runner assembly 51.

In Fig. 21, the dolly train 52 is shown with the platforms or covers removed and with the air lines leading to different cylinders omitted. The front and rear end dollies 70, 71 are of similar construction and differ only in minor details, mainly control relays for actuation of the pneumatic articulating means. Their respective arm pairs 73, 74 and 76, 77 are moved by cylinders 130, 131, 132 and 133, respectively. The cylinder pairs 130, 131 are attached to braces 134L on the frame 135 of dolly 70 by pivot pins 151L, and the cylinder pairs 132, 133 are articulately connected to the braces 134R on the frame 136 of the rear end dolly 71 by pivot pins 151R. Each of arms 73, 74, 76 and 77 is provided with a lever extension 137 to which the pistons of respective cylinders 130 to 133 are pivotally connected by means of pins 152. The piston rods of the cylinders can move the arms through a 90-degree arc. This movement brings the arms into engagement with the front and rear wheels of a vehicle, as has been described above in connection with Figs. 6 to 11.

The center dolly 72 has a steel frame 138 which carries the two pairs of air cylinders 78, 79. One end of each cylinder is pinned to the frame 138. The piston rods of cylinders 78 are pinned to the frame 135 of the front end dolly 70, and the piston rods of cylinders 79 are connected with the frame 136 of the rear end dolly 71. As before stated, the function of cylinder pairs 78, 79 is to move the end dollies 70, 71 with respect to the center dolly 72.

The purpose of the dolly train 52 is to engage the four wheels of a vehicle and to lift the same without touching the chassis. When the vehicle is lifted, the frames 135, 136 of end dollies 70, 71 with distended arms 73, 74 and 76, 77, respectively, rise above the frame 138 of the center dolly 72. This action is performed by the pneumatic cylinder jacks 142 placed in pairs near the ends of the wheel shafts 144 of dollies 70, 71. Each of their frames 135, 136 carries six jacks 142. The rods 143 of the jacks 142 are extended through the square steel shafts 144 whose ends are turned to receive roller bearings (not shown) on which the flanged wheels 75 rotate. When air is introduced into the cylinders of jacks 142, the piston rods 143 lift the frames 135, 136 whereby the extended dolly arms lift the vehicle above the level of the elevator platform 46 and the center dolly 72. The frame 135 and platform 135a of dolly 70 are shown in raised position in Fig. 24. Fig. 25 illustrates the planed down end 146 of the square shaft 144 which is received between a pair of guides 147. Guides 147 are part of the end dolly frames 135, 136. In this manner, the guides with the dolly frame are free to move vertically with respect to the shaft 144 to which the piston rod 143 is rigidly connected. The reciprocating piston of the cylinder jack 142 moves the dolly frame vertically above and away from the shaft 144 when air is introduced into the cylinder. The center dolly 72 is supported in similar manner on two square shafts 144 and flanged rollers 75 except that there are no cylinder jacks and the shafts 144 are rigidly connected with the dolly frame 138. Thus, the frame 138 of the center dolly cannot be raised.

Fig. 26 is an enlarged view of the upper left-hand corner of structure shown in Fig. 21. The extended position of the arm 74 is indicated in dot-dash lines. As will be observed in Fig. 27, the arm 74 is pivotally mounted on a pin 153 received in an upper socket 154 and a lower socket 155. Sockets 154, 155 form part of the dolly frame 135. Fig. 29 shows on an enlarged scale the manner of fastening a cylinder 131 to the pivot support 134L by means of the pin 151L. Support 134L is carried by the frame 135.

Figs. 28, 30 and 31 illustrate various switches for controlling the movements of dollies 70 to 72. The push plate 156, shown in Fig. 28, is resiliently mounted on that surface of a dolly arm 73 against which the front wheel 80 of a vehicle exerts pressure. Upon depression of plate 156, a limit switch 157 is actuated which transmits signals, via cable coil 169 shown in Fig. 34, to the dolly frame 135 and thence to the controls.

A safety limit switch 158 is shown in Fig. 30. Each free longitudinal end of dollies 70, 71 carries two such switches (see Fig. 36) which are actuated by feeler rods 159. If the dolly, during its movement, encounters an obstruction while traveling on rails 141, the feeler rods 159 actuate the switches 158 which stop the dolly train 52 and signal to the operator that proper functioning of the system is impeded.

Fig. 31 illustrates two limit switches 160, 162 on the end dolly 70 (see Fig. 32). Limit switch 160 is actuated by a trip 161 mounted on the platform of each of compartments 41, 42, 43L and 43R. Its function is to properly locate the dolly train on the platforms for deposition, lifting or removal of a vehicle. Limit switch 162 is actuated by a trip 163 mounted on the elevator platform 46 and locates the dolly train 52 centrally thereon. Similar limit switches (not shown) are provided on the chassis 136 of the end dolly 71 and are again actuated by trips on the platforms of various compartments 41 to 43 and on the elevator platform 46, respectively.

The air distribution system within the center dolly 72 is shown in Figs. 32 and 33. As before stated in connection with Figs. 13 and 14, compressed air is distributed to the various cylinders in the dollies from the tank 50 through the flexible conduit 90. The latter is connected to the pipe fitting 170. Pipes 171 and 172 lead from the member 170 to a flexible hose 173 whose other end is connected to the front end dolly 70. As may be observed in Fig. 33, frame 135 of the front dolly 70 is in raised position whereby the cylinders 78 are pivoted from horizontal and the hose 173 is flexed. Another branch pipe 174 and flexible hose 175 supply compressed air to the cylinders of rear end dolly 71. The loops in flexible hoses 173 and 175 allow for the raising or descent of respective frames 135, 136 of the end dollies 70, 71 and for the expansion or contraction of the dolly train 52.

To operate the cylinder pairs 78, 79 in the center dolly 72, tubing taps 176 are taken off pipe 171. Cable coil 168L (shown expanded in Fig. 32) connects dollies 70 and 72, and a similar cable coil 168R (shown compressed) is provided between the center dolly 72 and end dolly 71. Pressure switches 177 on the center dolly 72, over distributor elements 178 and through tubing 179, trigger the cylinders 131 for extension of the outer arms 74 after the plates 156 on inner arms 73 are pressed firmly against the vehicle wheels 80.

Figs. 34 and 35 illustrate the arrangement of pneumatic tubing in the front end dolly 70. From the flexible hose 173, air is led through pipe 181. Pressure tubing 182 leads air to inner arm extension cylinders 130, and tubing 183 leads air to the outer arm extension cylinders 131. In similar manner, tubing 184, 185 and 186 supplies the cylinders of lifting jacks 142. Cylinders 130, 131 operate in such manner that the respective arm pairs 73, 74 move outwardly when the piston rods of the cylinders are retracted. Pressure switches 178, connected with cylinders 131 through tubing 180, trigger the elevating cylinders of jacks 142 after the outer arms 74 are in firm engagement with the front wheels 80. The air distribution in the rear end dolly 71 is similar to that shown in Fig. 34 and therefore is not illustrated.

Fig. 36 schematically shows the electric and pneumatic control system for the operation of elevator platform 46, runner assembly 51 and dolly train 52. In addition to the compressed air distribution system 229, a 220-volt power source 222 and a 110-volt control source 223 are required. The control wiring 228 is shown in single lines. Two push buttons 199, 200 are provided for the platform of each of compartments 41 to 43, one to unpark and one to park a vehicle. When one of the buttons 199, 200 is pushed, a signal is conveyed to the elevator actuating mechanism to move the elevator platform 46 to a desired level and also to move the platform in the selected compartment into the immediate proximity of the elevator shaft 44 to be in proper position for loading or unloading. Red and green lights may be employed to indicate the condition of the system. For example, on depression of "park" button 200, a red light adjacent thereto lights up and remains lighted until the dolly train 52 is again empty and centered on the elevator platform, at which time the red light goes out and a green light becomes visible.

The operation of the parking system is as follows:

The dolly train 52 is assumed to be empty and centered on the elevator platform 46. A vehicle 47 is on the platform in compartment 41 ready to be parked. The green light (not shown) is on, indicating that the parking system is free of obstructions and that the parking operation may proceed. Upon depression of the "park" button 200 for a particular storage compartment 43L or 43R, for example the empty compartment 43L shown in Fig. 2, the elevator starts to move to the platform level of loading compartment 41 and the platform of compartment 43L moves into a position adjacent the elevator shaft 44. When this action is completed, the elevator door motor 202 is actuated through its starter 201 and the door 224 rises. A limit switch 203 at the top of elevator door 224 stops the motor 202 and starts the dolly train motor 95 through the starter 225 to move the dolly train under the waiting vehicle by means of the movable rack 61. The vehicle is properly positioned in compartment 41 in that one of its wheels 80 rests in the wheel stop 226 (see Fig. 2). When the one or both front wheels 80 are properly located in the depressions 226 and the limit switch 160 (see Fig. 31) is tripped by the stationary stop 161 on the platform in compartment 41, the dolly train 52 is in proper position under the vehicle to begin the lifting operation. Aside from stopping the dolly train, the switch 160 also actuates the solenoid operated valves 205 for actuation of inner arms 73 and 76 (see Fig. 34), which control cylinders 130 and 132 in the respective dollies 70 and 71. The inner arms 73 and 76 then expand for 90 degrees in which position they trip the limit switches 206 which, in turn, actuate the solenoid operated valves 207 controlling the cylinders 78 to move the front end dolly away from the center dolly 72. This movement brings the inner arms 73 of the front end dolly 70 into engagement with the front wheels 80 (see Fig. 8), and the pressure plates 156 (see Fig. 28) trip the limit switches 157 which start the motor 95 to move the center dolly 72 away from the front end dolly 70, and at the same time trip the solenoid operated valves 208 on the cylinders 79 for movement of the rear end dolly 71, which causes the dolly 71 to move away from the center dolly 72 until the inner arms 76 come into engagement with the rear wheels 81 of the vehicle. This movement of the center dolly 72 and of the rear end dolly 71 away from the front end dolly 70 stops only when the inner arms 76 are in engagement with the rear wheels 81, and the loader or dolly train 52 can thus be used with many types of vehicles regardless of the wheelbase of the car. As the wheels 80, 81 are firmly engaged by the inner arms 73, 76, respectively, pressure builds up in cylinders 78, 79 and causes switches 177 (see Fig. 32) to trip the valves 209 on the cylinders 131 and 133 (see Fig. 34) which thereupon cause expansion of the respective outer arms 74 and 77 on the end dollies 70, 71. The arms 74 and 77 extend for 90 degrees or less until they press against the wheels 80, 81, respectively. Each of the four wheels is now gripped by a pair of extended arms. As this action is completed, pressure builds up in cylinders 131 and 133 to act on the pressure switches 178 (see Fig. 34) which, when tripped, send signals to the solenoid operated valves 210 of the jack cylinders 142, which causes respective frames 135, 136 of end dollies 70 and 71 to rise with the vehicle. The weight of the vehicle is now carried entirely by the dolly train 52 which can move therewith into the selected compartment.

When the jacks 142 reach the upper limit of their movement, they trip four limit switches 211 which start the loader motor 95 to move the dolly train 52 with its burden back onto the elevator platform 46. When the dolly train is centered on the platform, the limit switch 162 on the dolly 70 hits the stationary stop 163 (see Fig. 31) which stops the motor 95 and causes the elevator door 224 to close. The fully closed elevator door 224 trips the limit switch 212 to send a signal to the elevator control system to raise or lower the platform 46 to the proper parking level, in present instance to the level of platform in the uppermost compartment 43L, as shown in Fig. 2. When this level is reached, a signal returns to the loader motor to move the dolly train with the vehicle thereon to the left into the compartment 43L. With the dolly train 52 in proper position for the parking of vehicle 47, a limit switch similar to switch 160 (see Fig. 31) again stops the loader motor 95 and trips the solenoid operated lowering valves 210 associated with the jacks 142. When the jacks 142 move the frames of end dollies 70, 71 back to the level of center dolly 72, the wheels 80, 81 rest on the platform of compartment 43L, whereupon the jacks 142 trip the limit switches 220 which cause retraction of arms 73, 74 and 76, 77, as well as contraction of the dolly train due to the actuation of pistons in cylinder pairs 78, 79. When the arms are fully folded, limit switches 217 actuate the motor 95 which moves the dolly train 52 back onto the elevator platform 46, where a limit switch 165, mounted in a manner similar to that of switch 162, is tripped by a stop on the platform 46 to disconnect the motor 95. The tripping of this limit switch also causes the red light on the control panel to go out and lights the green light, indicating that the dolly train 52 and the elevator are ready for the next action. The elevator platform remains at the level of the uppermost compartment 43L until the "park" or "unpark" button of another compartment is depressed.

If the car is not properly positioned for engagement with the arms 73, 74 and 76, 77, or when a tire has gone flat, or if an obstruction is encountered which would impede proper operation of the dolly train, the safety guards or feelers 159, one at each free end of the end dollies 70, 71, actuate limit switches 158 connected to the control system in such manner that the motor 95 is stopped when one of these switches is tripped. The switches 158 also send signals to the control panel to warn the operator of the obstruction in order that immediate remedial action may be taken.

For the unloading or unparking of an automobile, the system is operated as follows:

The loader or dolly train 52 is assumed to be empty and located in the center of elevator platform 46. The green light is on, showing that the apparatus is ready for use. By depressing the "unpark" button 199 which is connected with the control mechanism of a selected parking compartment 43L or 43R, the elevator is started to move the elevator platform 46 to the level of the compartment from which the automobile should be removed, and also moves the platform in said compartment into a position adjacent the elevator shaft 44. The loader motor 95 is then started to move the dolly train 52 onto the left- or right-hand platform of the parking compartment under the parked vehicle. The vehicle is properly positioned on the compartment platform because it was left in such position by the dolly train at the end of the preceding parking operation. For example, and as shown in Fig. 2, its wheels are engaged by the park stops 227. The dolly train 52 is stopped by the limit switch 160 which is tripped by the stop 161 (see Fig. 31) on the platform of the compartment 43. The tripping of limit switch 160, in addition to stopping the loader motor 95, also causes actuation of the inner arm extending solenoid operated valves 205 of the cylinders 130 and 132. The inner arms 73 and 76 then extend and trip the limit switches 206 which actuate the solenoid operated valves 207 on the extending cylinders 78. The front dolly 70 moves away from the center dolly 72 and engages the wheels 80 of the parked vehicle, whereupon the depression of plates 156 on the inner arms 73 causes tripping of limit switches 157 which again start the loader motor 95 to move the center dolly 72 toward the rear wheels 81. The plates 156 also trip the solenoid operated valves 208 on the rear dolly extending cylinders 79, which causes the rear end dolly 71 to move away from the center dolly 72. This combined movement of dollies 71 and 72 brings the inner arms 76 into engagement with wheels 81 regardless of the wheelbase of the vehicle. Upon completion of the movement of dollies 71 and 72, and when sufficient pressure builds up in the cylinders 78, 79, pressure switches 177 are actuated to cause movement of outer arms 74 and 76 by tripping the valves 209 associated with the outer arm cylinders 131 and 133. The outer arms 74 and 77 now press against the respective wheels 80, 81 from opposing sides. Pressure then builds up in cylinders 131 and 133, and acts on the pressure switches 178 which are tripped and thereupon send a signal to the solenoid operated valves 210 of the jack cylinders 142 to lift the frames of end dollies 70 and 71. The weight of the automobile is again carried solely by the dolly train 52 which is now ready to move back onto the elevator platform 46. Such signal is sent to the motor 95 when the frames of jacks 142 reach their uppermost position and trip limit switches 211. When the dolly train is centered on the elevator platform 46, the limit switch 162 hits against the stop 163 (see Fig. 31) to stop the motor 95 and to send a signal to the elevator motor which thereupon moves the platform 46 with the dolly train 52 and a vehicle 47 thereon to the level of platform in the unloading compartment 42. When this level is reached, a signal returns to the elevator door motor to open the door on the unloading side of the elevator. This door and its motor are not shown in Fig. 36 because they operate in a manner analogous to that of members 202 and 224.

When the door is fully opened, a limit switch at its top stops the door motor and again starts the loader motor 95 in the opposing direction to extend the dolly train 52 onto the platform in compartment 42.

When the dolly train 52 reaches its proper position in compartment 42, a limit switch 164, mounted in a manner similar to that of switch 160 (see Fig. 31), stops the loader motor 95 and trips the solenoid operated valves 210 of the jacks 142 to lower the frames of end dollies 70 and 71. When their movement is completed, the weight of the vehicle is transferred to the platform in the compartment 42, which trips limit switches 220 to retract or fold the arms 73, 74 and 76, 77 on the end dollies 70 and 71, respectively. The folded arms cause limit switches 217 to again start the loader motor 95 in reverse and to thus move the dolly train 52 back onto the elevator platform 46 where the limit switch 165, similar in construction to switch 162, is tripped by a stop on the elevator platform 46 to stop the motor 95 and to bring the dolly train 52 into position of rest in the elevator platform center. The tripping of switch 165 also causes the door motor to close the elevator door. A limit switch at the bottom of the elevator door causes the red signal light to go out and lights the green light to indicate to the operator that the empty dolly train 52 is back on the elevator platform 46 ready for the next use.

While I have described and illustrated in great detail what I believe to be the preferred form of my invention and of the best manner of making use of the same, it will be understood that the details disclosed should not be construed in a restrictive sense, and that various changes and modifications in the shape and arrangement of several parts may occur to men skilled in the art without departing from the spirit and scope of the invention as set out in the appended claims.

I claim:

1. In combination with a vertically movable elevator platform having an upper face and two ends, a pair of parallel rails on the upper face of said platform extending between said ends thereof, loader means including roller wheels on said rails for supporting and moving an at least four-wheeled vehicle thereon, said loader means including a center dolly, a pair of end dollies each having frame means, two pairs of arms on the frame means of each of said end dollies articulable into substantial parallelism with and into a position substantially at right angles to said rails, first pneumatic means for articulating said arms, second pneumatic means for moving said end dollies toward and away from said center dolly, third pneumatic means for lifting the frame means of said end dollies above the level of said center dolly, means for sequentially actuating said first, said second and said third pneumatic means, means operatively connected with said center dolly for moving same along said rails, and electric means for actuating said last named means by remote control.

2. In a vehicle parking system, the combination of a structure defining an elevator shaft having two opposing sides and a plurality of parking compartments adjacent to the elevator shaft at said opposing sides, thereof, an elevator in said shaft having a horizontal platform, a platform in each of said compartments, means for moving said last mentioned platforms into a position adjacent to said elevator shaft, a pair of rails on said elevator platform and on each of the platforms in said compartments with the rails on said last mentioned platforms mounted in such manner as to form extensions of the rails on said elevator platform when the platforms in said compartments are adjacent to said elevator shaft, a dolly train normally positioned on the rails substantially centrally on the platform of said elevator, said dolly train including a center dolly, a first end dolly and a second end dolly both connected with said center dolly, first pneumatic cylinder means for moving said first end dolly with respect to said center dolly, second pneumatic cylinder means for moving said second end dolly with respect to said center dolly, each of said end dollies having a frame, a pair of inner arms and a pair of outer arms articulately connected to said frame in such manner that they are in substantial parallelism with said rails in one extreme position and substantially at right angles thereto in the other extreme position, third pneumatic cylinder means for moving the inner arms of said first end dolly, fourth pneumatic cylinder means for moving the inner arms of said second end dolly, fifth pneumatic cylinder means for moving the outer arms of said first end dolly, sixth pneumatic cylinder means for moving the outer arms of said second end dolly, pneumatic jack means on each of said end dollies for vertically moving said frames thereof when the arms are in said last mentioned extreme positions, reversible motor means, an operative connection between said motor means and said center dolly for moving the dolly train on the rails from said elevator platform into a selected compartment and for returning the dolly train onto the platform of said elevator, a source of compressed fluid, conduit means for connecting each of said cylinder means and said jack means with said source, and control means in said conduit means for selectively actuating said cylinder means and said jack means, and for actuating said motor means in a predetermined sequence in response to a single impulse.

3. An automobile loader comprising, in combination, a center dolly, a first end dolly, a second end dolly, each of said dollies having a plurality of wheels and each of said end dollies having a frame, said end dollies being connected with said center dolly for travel therewith, a pair of inner arms and a pair of outer arms attached to the frame of each of said end dollies and articulable in a substantially horizontal plane into a first extreme position in which said arms are adjacent to the frames and into a second extreme position substantially at right angles to the first extreme position, first pneumatic means for moving said first end dolly with respect to said center dolly, second pneumatic means for moving said second end dolly with respect to said center dolly, third pneumatic means for actuating the inner arms of said first end dolly, fourth pneumatic means for actuating the inner arms of said second end dolly, fifth pneumatic means for actuating the outer arms of said first end dolly, sixth pneumatic means for actuating the outer arms of said second end dolly, seventh pneumatic means for lifting the frames of said end dollies above said center dolly, reversible motor means operatively connected with said center dolly for moving said loader, a supply of compressed fluid, flexible conduit means for connecting said supply with each of said pneumatic means, and control means associated with said pneumatic means and said motor means in such manner that in response to a single impulse said motor means and said pneumatic means are actuated in a predetermined sequence.

4. In a system for parking and unparking of four-wheeled vehicles, the combination of a structure having an elevator shaft, a vertically movable elevator therein having two opposing sides, and a plurality of compartments in communication with said elevator shaft and adjacent to the opposing sides of said elevator, a loader consisting of a center dolly, a first end dolly and a second end dolly, means extending between the opposing sides of said elevator and into said compartments for providing ways for said loader and mounted in such manner that said loader is adapted to be moved from said elevator into a selected compartment when said elevator is at the level of such selected compartment, articulable arms on said end dollies for engaging each wheel of a four-wheeled vehicle from two opposing sides thereof, first pneumatic means on said loader for moving said arms in a substantially horizontal plane into a first extreme position in which the arms are substantially parallel with said ways and into a second extreme position substantially at right angles to the first extreme position in which the arms are in engagement with the wheels, said loader being of such width as to fit longitudinally between the wheels of a four-wheeled vehicle when said arms are in the first extreme position, second pneumatic means on said loader for moving the end dollies with respect to said center dolly, jack means for lifting selected portions of said end dollies and said arms above the level of said center dolly, reversible motor means for moving the loader on said ways in two directions, and control means for selectively actuating said motor means, said first and said second pneumatic means, and said jack means in a predetermined sequence.

5. The structure of claim 4, further comprising an operative connection between said motor means and said center dolly including a stationary rack attached to said elevator in parallelism with said ways, a movable rack supported on said elevator in parallelism with said stationary rack, a gear meshing with said stationary rack and said movable rack, a housing for said gear adapted to move along said stationary rack and comprising means for maintaining said gear in meshing engagement with said racks, a cable connection between said housing and said motor means for moving said gear along said stationary rack whereby said movable rack extends into one of said compartments, and a connection between said center dolly and said movable rack.

6. The structure of claim 5, further comprising pressure sensitive means on said first and said second end dolly operatively connected with said motor means for arresting same when said first or said second end dolly meets an obstruction during the movement of the loader on said ways into or out of one of said compartments.

7. The structure of claim 4, further comprising locator means on said elevator and in each of said compartments, and arresting means on said first end dolly and said second end dolly operatively connected with the motor means for arresting same when said locator means abuts thereagainst.

8. The structure of claim 4, wherein said second pneumatic means includes a first pair of cylinders pivotally connected with said center dolly and each having a reciprocable member pivotally connected with said first end dolly, and a second pair of cylinders pivotally connected with said center dolly and each having a reciprocable member pivotally connected with said second end dolly, said first and said second end dolly each having a frame including a plurality of wheels adapted to travel on said ways and a platform member with said arms connected to said platform member, and said jack means including a plurality of cylinders connected to the frames of said end dollies and each having a reciprocable member connected to the respective platform members of said end dollies for lifting same together with said arms, said system further comprising a source of compressed fluid and at least partially flexible conduit means for connecting said supply with said first pair of cylinders, said second pair of cylinders, the cylinders of said jack means and said first pneumatic means.

9. An automobile loading device, comprising, in combination, a center dolly, a first end dolly, a second end dolly, each of said end dollies having a pair of opposing sides, means for connecting said center dolly with said first and said second end dolly, respectively, and for moving said end dollies with respect to said center dolly, each of said dollies including a plurality of wheels for travel in two directions and the width of said dollies being less than the average distance between the front or rear wheels of an automobile, said first and said second end dolly each having a pair of inner arms and a pair of outer arms with one inner arm and one outer arm articulately connected to each of the opposing sides of said end dollies in such manner as to be movable into a first position substantially parallel with the direction of travel of said loading device and into a second position substantially at right angles to said first position, the distance between the inner arms on said first end dolly and on said second end dolly being less than the average distance between the front and rear wheels of an automobile when said first and said second end dolly are adjacent to said center dolly, means for actuating said arms, means for lifting selected portions including said arms of said first and said second end dolly above and away from said wheels thereof, a movable rack parallel with the direction of movement of said loading device and operatively connected with said center dolly, a stationary rack, a floating gear between said stationary rack and said movable rack for moving the movable rack and the loading device in two directions, and means operatively connected with said gear for rotating same.

10. The structure of claim 9, wherein each of said end dollies comprises a rectangular frame and the inner and said outer arms of said end dollies are connected to the frames in the proximity of the median portions thereof, said arms being adjacent to said frames in the first positions thereof and being at substantially right angles thereto in the second position thereof.

11. In an automobile parking and unparking system, the combination of a structure having an elevator shaft, a vertically movable elevator therein having two opposing sides, and a plurality of compartments in communication with said elevator shaft at said two opposing sides thereof, a platform member attached to the underside of said elevator, loader means for lifting and transferring four-wheeled vehicles into and from one of said compartments and onto and off said elevator, said loader means comprising a first pair of parallel rails on the elevator extending between said opposing sides thereof, second pairs of equally spaced rails forming continuations of the first pair of rails in each compartment when the elevator is at the level of a selected compartment, a dolly train normally positioned on said first pair of rails on the elevator, said dolly train comprising a center dolly, a first end dolly, a second end dolly, each of said end dollies having two sides, first cylinder and piston means for adjustably connecting the center dolly with said end dollies in such manner that said end dollies are movable on said first or one of said second pairs of rails toward and away from the center dolly for a predetermined distance, a pair of inner arms and a pair of outer arms articulately connected to the sides of said end dollies in such manner as to be movable in a substantially horizontal plane into a first position in substantial parallelism with said pairs of rails and into a second position substantially at right angles to said first position, second cylinder and piston means attached to said end dollies for sequentially actuating said inner and said outer arms thereof, third cylinder and piston means for lifting selected portions of said end dollies including said inner and said outer arms thereof above the level of said center dolly, means on the elevator for moving said dolly train on said first pair of rails onto one of said second pairs of rails in a selected compartment and for returning said dolly train onto said first pair of rails, said last named means including a stationary rack on said elevator, a movable rack parallel with said stationary rack, a floating gear between said stationary rack and said movable rack, a connection between said movable rack and said center dolly, a reversible motor on said platform member, an operative connection between said motor and said floating gear including a pair of sheaves connected to the opposing sides of said elevator and cable means extending from said motor over said sheaves and connected with said gear, a source of compressed fluid on said platform member, flexible conduit means between said source and said first, said second and said third cylinder means, and a plurality of control elements operatively associated with said first, said second and said third cylinder and piston means, and with said motor for selectively actuating same in a predetermined sequence.

12. The structure according to claim 11, wherein said first cylinder and piston means is pivotally connected with said center dolly and with said end dollies, respectively, whereby to allow raising of said end dollies above the level of said center dolly by said third cylinder and piston means.

13. The structure of claim 12, further comprising a spring loaded reel on said platform member in communication with said source of compressed fluid and operatively connected with said flexible conduit means for feeding or retracting said flexible conduit means when the dolly train is moved by said motor.

References Cited in the file of this patent
UNITED STATES PATENTS

| | | |
|---|---|---|
| 1,584,080 | Dinkelberg | May 11, 1926 |
| 1,875,052 | Ljungkull | Aug. 30, 1932 |
| 2,004,438 | Judd | June 11, 1935 |
| 2,629,507 | Olson | Feb. 24, 1953 |
| 2,752,051 | Strahm et al. | June 26, 1956 |
| 2,818,186 | Sinclair | Dec. 31, 1957 |